United States Patent [19]

Tompkins et al.

[11] Patent Number: 4,857,820

[45] Date of Patent: Aug. 15, 1989

[54] CORDLESS BATTERY CHARGER

[76] Inventors: John C. Tompkins, 202 W. Heard; Charles E. Cook, 607 E. Ymbacion, both of Refugio, Tex. 78377

[21] Appl. No.: 94,115

[22] Filed: Sep. 8, 1987

[51] Int. Cl.⁴ .................................................. H02J 7/00
[52] U.S. Cl. ............................................ 320/2; 320/21; 320/39
[58] Field of Search ............................ 320/2, 21, 39, 40

[56]  References Cited

U.S. PATENT DOCUMENTS

| | | | |
|---|---|---|---|
| 2,044,917 | 6/1936 | Richardson | 320/6 X |
| 3,309,598 | 3/1967 | Montgomery et al. | 320/2 |
| 3,463,995 | 8/1969 | Herold | 320/6 |
| 3,504,262 | 3/1970 | Sada et al. | 320/6 |
| 3,534,354 | 10/1970 | Galginaitis | 320/48 X |
| 3,594,627 | 7/1971 | Lesher | 320/21 |
| 3,694,729 | 9/1972 | Jones | 307/150 |
| 3,763,415 | 10/1973 | Ownby | 320/6 |
| 3,775,659 | 11/1973 | Carlsen, II | 320/21 |
| 3,896,364 | 7/1975 | Reister | 320/2 |
| 3,949,289 | 4/1976 | Day | 320/6 |
| 4,004,208 | 1/1977 | Tamminen | 320/2 |
| 4,006,397 | 2/1977 | Catotti et al. | 320/31 |
| 4,069,451 | 1/1978 | Rouse | 322/1 |
| 4,092,580 | 5/1978 | Prinsze | 320/2 |
| 4,258,305 | 3/1981 | Anglin | 320/2 |
| 4,264,855 | 4/1981 | Ghibaudo et al. | 320/6 |
| 4,398,139 | 8/1983 | Prinsze | 320/2 |
| 4,540,929 | 9/1985 | Binkley | 320/2 |
| 4,584,514 | 4/1986 | Kaminski | 320/33 |
| 4,638,236 | 1/1987 | Carr et al. | 320/21 |
| 4,692,680 | 9/1987 | Sherer | 320/2 |

Primary Examiner—Robert J. Hickey

[57] ABSTRACT

A rechargeable emergency portable battery charger for starter motor storage batteries. The device includes a sealed lead acid battery as a source of energy. An oscillator circuit connected to a transformer generates 3 V in its secondary. This voltage is rectified and added in series to the 12 V of the self-contained battery to provide charging current to a starter motor storage battery. Connection is made via a cigarette lighter socket in the disabled vehicle. Current is limited to approximately 4 amps so as to limit heat dissipation to a safe level. Furthermore, a voltage-sensing circuit determines if the voltage of the starter storage battery is below approximately 6 V or is shorted to ground. In either case, output current is further limited to the point of cut-off. Recharging the self-contained battery is made possible by a switch that connects the cigarette lighter of a running car directly to the self-contained battery of the charger. This switch also permits connection of any 12 VDC device directly to the self-contained battery. An ammeter monitors current flow in this power pack mode, as well as the charging and recharging modes. A light-emitting diode circuit indicates when the charging of the starter motor storage battery is complete.

20 Claims, 1 Drawing Sheet

CORDLESS BATTERY CHARGER

BACKGROUND OF THE INVENTION

1. Field of the Invention

The present invention relates to a self-contained emergency battery charger. It is intended for use in systems in which a battery is used to start a motor.

2. Description of the Prior Art

Starter batteries often become sufficiently discharged so as to be unable to start a motor. This is often due to lights or other accessories being accidentally left on. Also, defective vehicle charging systems can result in the same problem.

Conventional methods of starting such a disabled vehicle include push-starting, using jumper cables and using conventional battery chargers. Both push-starting and jumper cables require the presence of another car. Furthermore, jumper cables are hazardous because, if improperly connected, they can lead to damage of the vehicle's electrical system. Also, an explosion of battery gases is possible.

The disadvantage of conventional battery chargers is the need to be near a source of external power such as 120 volts alternating current (VAC).

Several self-contained emergency battery chargers have been developed. These include U.S. Pat. No. 4,004,208 (Tamminen) and U.S. Pat. No. 4,540,929 (Binkley). Tamminen's device provides a slow recharge cycle, whereas Binkley's device offers only passive current regulation with a resistor. Binkley's device cannot deal with a short circuit or a severely discharged battery without excessive heating. Additionally, the rather large value of resistor that must be used in this scheme severely limits charging current as the vehicle's battery begins to come up in voltage.

Other devices in the art include those disclosed in U.S. Pat. Nos. 3,504,262 (Sada et al); 4,258,305 (Anglin) and 3,763,415 (Ownby). Their disadvantages are a need for an external source of power, insufficient portability or lengthy charging/recharging times.

BRIEF SUMMARY OF THE INVENTION

It is the object of this invention to provide a portable, compact battery charger to vehicles that have experienced a drained battery emergency. Charging is normally done through the cigarette lighter socket. An alternate use of the device is as a battery pack for 12 V accessories.

Another object of the present invention is to provide a charger than does not require an external source of power. It is not necessary to plug it into any source of alternating current. A self-contained battery provides the necessary energy.

Another object of the present invention is speedy recharging of the device from a running vehicle back through the cigarette lighter. Charging from 120 V AC can also be accomplished with an AC adapter.

Briefly, a preferred embodiment of the present invention consists of a 12 V, sealed lead acid battery and a switching power supply deriving its energy from the battery. To be effective in charging a vehicle battery, it is desired to produce approximately 15 V of output voltage. The battery already supplies 12 V so it is only necessary to generate an extra 3 V. The advantages of the approach are economic. It is less expensive to generate 3 V rather than the entire 15 V. The two summed voltages are applied to the vehicle battery either through the cigarette lighter or straight to the battery using adaptor clips. Current is limited to approximately 4 amps using a transistor regulator. This regulator additionally senses the voltage of the battery being charged. If this voltage is below 6 V, current flow is further restricted.

The advantage of this arrangement is protection against overheating due to a defective vehicle battery or a short circuit.

Another advantage of this arrangement is compact size and weight.

A further advantage of the provision of a current meter that indicates the progress of both recharging and charging functions.

Finally, another advantage is an indicator light that indicates when charging is complete.

DETAILED DESCRIPTION OF THE PREFERRED EMBODIMENTS

Figure 1:
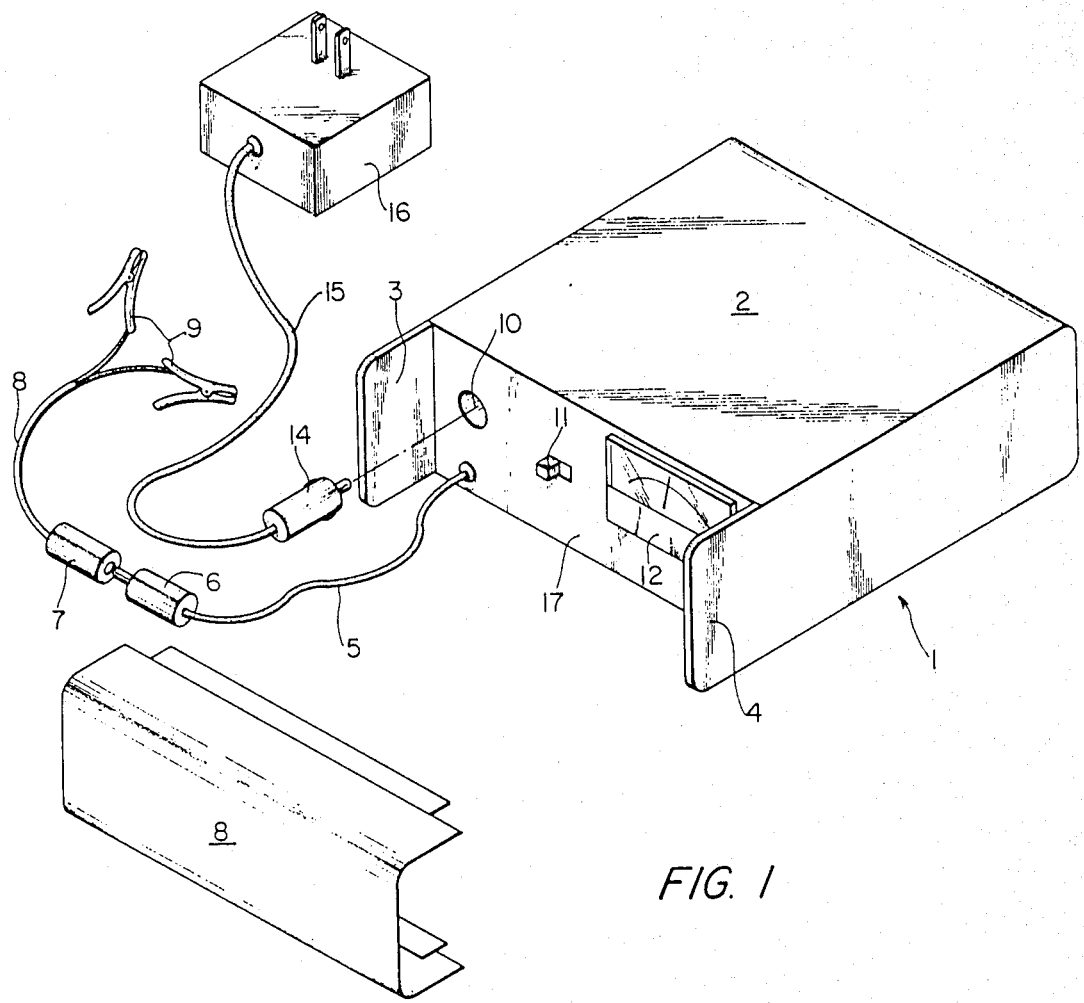
FIG. 1 is a perspective view of the case housing the present invention with the lid removed, showing its physical configuration and revealing the instrumentation of the panel. Also shown is a set of adaptor clips for direct connection to a battery. Also shown is an AC adaptor for recharging the device from 120 VAC.

FIG. 1 illustrates the physical configuration of the present invention. The general reference character 1 refers to the charger. The charger 1 is housed in a metal or plastic housing 2 which is approximately 7.2"×3"×6.5", including the protruding side rails 3 and 4. A cable 5, with a cigarette lighter-type plug 6, is for connection to a cigarette lighter socket of a disabled vehicle. Adaptor clips 9 and elongated cable 8 alternately give a method of direct connection to a battery. Plug 6 mates with socket 7 to affect this mode of operation. Socket 10 provides a means of connecting 12 V accessories directly to the battery inside housing 2. Switch 11 is an ON/OFF switch. In its ON position, approximately 15 V is generated and applied to plug 6. The flow of current in this mode is observed by deflections to the right of current meter 12. In its OFF position, plug 6 may be inserted into the cigarette lighter socket of a running vehicle and the battery of the present invention will be recharged. Monitoring of the recharging process is noted by observing deflection of meter 12 to the left. Indicator light 13 comes on when the vehicle battery being charged is near 12.5 V, indicating a complete charge.

Power supply 16, cable 15 and plug 14 provide an alternative means of recharging the battery of the present invention. Power supply 16 is plugged into a source of 120 VAC power. Plug 14 is then mated with socket 10.

Lid 18 covers the instrument panel 17 with cable 15 coiled in between the protruding side rails 3 and 4.

Figure 2:
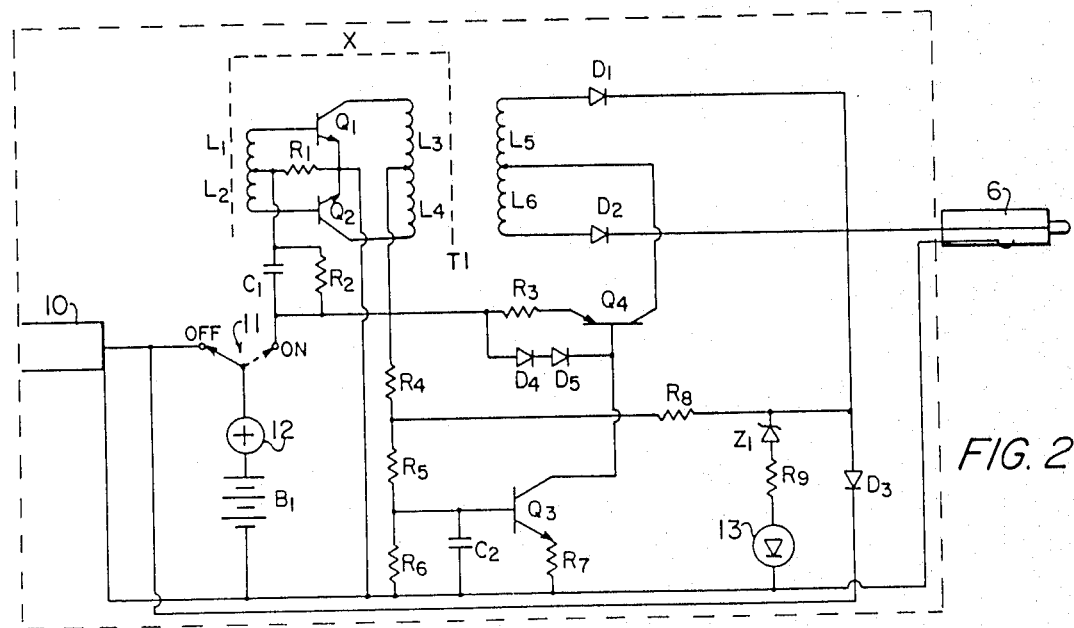
FIG. 2 is a schematic circuit diagram of a preferred embodiment of the present invention.

Charger 1 of FIG. 1 and the components within housing 2 and on panel 17 are shown bounded by a dashed line in FIG. 2.

Battery B1 has its positive terminal applied to bidirectional ammeter 12. The opposite side of ammeter 12 is applied to the pole of single pole, double throw switch 11. In its OFF position, switch 11 applies metered current to cigarette lighter socket 10. Notice that in this mode, diode D3 blocks current flow through plug 6. This OFF mode is intended for supplying power to 12 V accessories through socket 10.

With switch 11 in the ON position, voltage is applied to the base circuits of NPN transistors Q1 and Q2. A surge of current is supplied through capacitor C1 just after switch 11 is moved to the ON position. Capacitor C1 is connected from the ON terminal of switch 11 to the junction of inductors L1 and L2. Resistor R2 is in parallel with capacitor C1 so as to discharge it during steady-state operation. Also connected to the junction of inductors L1 and L2 is resistor R1. The other side of resistor R1 is connected to the two emitters of transistors Q1 and Q2 so that currents developed by inductors L1 and L2 may be fed into the bases of transistors Q1 and Q2. Resistor R1 completes these base emitter current loops. The collectors of transistors Q1 and Q2 are connected to inductors L3 and L4, respectively. The other ends of inductors L3 and L4 are joined and returned to the ON side of switch 11.

In operation, the current surge supplied through capacitor C1 causes one of the transistors Q1 or Q2 to come on before the other. This is because of an imbalance in the gains of transistors Q1 and Q2. Suppose transistor Q1 comes on first. It will draw current from battery B1 through meter 12, through the ON side of switch 11, and finally through inductor L3. Inductor L3 acts as a primary of transformer T1. Inductors L1 and L2 act as secondaries. The induced voltages and phased windings of the inductors serve to create a voltage in inductor L1 that further drives transistor Q1 into conduction. The induced voltage in inductor L2 serves to turn transistor Q2 off. The current through the collector of transistor Q1 and inductor L3 continues to increase until the core of transformer T1 is saturated. At this point the lines of magnetic flux in inductors L1 and L2 collapse and a reverse voltage is induced. This reverse voltage is in such a direction as to turn off transistor Q1 and the induced voltage in inductor L2 turns on transistor Q2. Current increases in transistor Q2 until once again the core is saturated. Again, there is a collapse of magnetic flux and transistors Q1 and Q2 reverse roles. This oscillation continues as long as switch 11 is in the ON position.

The ON side of switch 11 is also connected to resistor R3, which serves as an emitter resistor for transistor Q4. Transistor Q4 is a series pass current regulator. It will limit current flow to approximately 4 amps. Current flowing up from battery B1, through meter 12, through the ON position of switch 11, and finally through resistor R3 will develop enough negative feedback voltage across resistor R3 so as to prevent transistor Q4 from being turned on any beyond 4 amps. Diodes D4 and D5 are in series and connect from the ON position of switch 11 to the base of transistor Q4. Both cathodes of diodes D4 and D5 face toward the base of transistor Q4. The forward voltage drop developed across diodes D4 and D5 establish a voltage reference to which the voltage drop across R3 is compared. When current through R1 exceeds 4 amps, the emitter of transistor Q4 is lowered in voltage with respect to the base. This prevents further increase in the drive current and consequently the collector current of transistor Q4 is limited to approximately 4 amps.

Current from the collector of transistor Q4 flows to the center tap of transformer T1. Voltages are induced in inductors L5 and L6 as a result of the oscillator circuit on the primary side of transformer T1. An induced voltage of approximately 4 V in each inductor L5 and L6 is rectified during alternate half cycles by diodes D1 and D2. Thus, the 12 V of battery B1 is added to a generated voltage from the inductors L5 and L6 to produce 16 V. Subtracting the voltages lost across transistor Q4, its emitter resistor R3 and the forward voltage drops of diodes D1 and D2, it is determined that a maximum of 15 V is available at plug 6. Plug 6 is then inserted into the cigarette lighter socket of a disabled vehicle so that its battery may be charged. Alternatively, the adaptor clips 9, cable 8 and socket 7 of FIG. 1 may be used to connect directly to the battery of a vehicle in which there is no cigarette lighter socket. Clips 9 are connected to the battery posts. Then plug 6 and socket 7 are mated to effect this mode of operation.

Resistors R4, R5, R6, R7, R8, transistor Q3 and capacitor C2 comprise a voltage-sensing circuit that further restricts current flow through series pass transistor Q4. When the voltage of the battery being charged at plug 6 is below 6 V, drive current to the base of transistor Q4 is reduced. As the battery being charged approaches zero voltage, the drive to transistor Q4 is cut off and essentially no current flows through the collector of transistor Q4 and, hence, to the output of plug 6. This protects transistor Q4 from overheating as the result of short circuits faced by plug 6 or as a result of severely discharged or defective batteries being charged.

Resistor R4 is connected to the ON side of switch 11. The other end of resistor R4 connects to both resistor R5 and resistor R8. The opposite end of resistor R8 connects to the output plug 6. The other end of resistor R5 connects to resistor R6, capacitor C2 and the base of transistor Q3. The emitter of transistor Q3 connects to resistor R7. The opposite ends of resistor R7, resistor R6 and capacitor C2 connect to ground. The collector of transistor Q3 goes directly to the base of Q4.

In operation, resistors R4, R5, R6 and R8 form a voltage divider network. These resistors are selected so that with the voltage at plug 12 above 6 V, the divider network supplied sufficient drive to the base of transistor Q3 so that it, in turn, supplies enough drive current via its collector to the base of transistor Q4. Enough drive current is supplied so that transistor Q4 has approximately 4 amps of collector current.

As the voltage at plug 6 falls below 6 V, the small value of resistor R8 has an increasing influence on the divider chain consisting of resistors R4, R5 and R6. The result is a decreasing voltage at the base of transistor Q3. As a result, collector current of transistor Q4 also is reduced. As the voltage at plug 6 falls toward zero, this process continues until transistors Q3 and Q4 are both turned off. Capacitor C2 is for the purpose of filtering out switching transients from inductors L5 and L6.

Zener diode Z1, resistor R9 and light-emitting diode 13 comprise a circuit that indicates when the charging of a vehicle battery is complete. The vehicle battery being charged is connected via plug 6 to the cathode of zener diode Z1. The anode of zener diode Z1 is connected to resistor R9. The opposite end of resistor R9 is connected to the anode of light-emitting diode 13, and finally, the anode of light-emitting diode 13 is connected to ground.

In operation, when the voltage at plug 6 reaches approximately 12.5 V, zener diode Z1 begins its reverse conduction. Current flows in series through zener diode Z1, resistor R9, and finally, through diode 13. This current flow causes light-emitting diode 13 to glow.

Diode D3 has its anode connected to plug 6 and its cathode to the OFF position of switch 11. With switch 11 in the OFF position, plug 6 is connected via a vehicle cigarette lighter socket to the electrical system of a running car. Charging current flows from plug 6, through diode D3, through the OFF position of switch 11, through meter 12, and finally, into battery B1. When charging is complete, plug 6 is removed from the cigarette lighter socket of the vehicle. Diode D3 also serves another purpose. If plug 6 is inserted into the cigarette lighter socket of a disabled vehicle with switch 11 in the OFF position, then diode D3 blocks current from battery B1 from flowing to the disabled battery. If this flow is not blocked, a severely discharged vehicle battery could draw enough current to damage the present invention or blow a fuse in the vehicle.

An alternate means of charging is by using AC adaptor 16 of FIG. 1. AC adaptor 16 is connected to household current. Cable 15 and plug 14 enable connection to socket 10. Recharging in this mode is identical to that already described from a running vehicle with the exception that charging current does not flow through diode D3. When charging is complete, plug 14 is disconnected from socket 10 and the charger and cable are stowed for future use.

Battery B1 is a sealed lead acid battery and in the preferred embodiment has an output voltage of 12 V, rated at 6.5 amps per hour. The resistor, capacitor, transistor and diode values and types used in the preferred embodiment are as follows. Resistor R1 is 4.7 ohms. Resistor R2 is 1 K ohms. Resistor R3 is a 0.1 ohm. Resistor R4 is 100 ohms. Resistor R5 is 330 ohms. Resistor R6 is 39 ohms. Resistor R7 is 2.2 ohms. Resistor R8 is 18 ohms. Resistor R9 is 330 ohms. Capacitor C1 is 0.1 microfarad. Capacitor C2 is 1 microfarad. Transistors Q1, Q2 and Q3 are of the type TIP 41. Transistor Q4 is a TIP 34. Diode D3 is a 1N5818. Diodes D4 and D5 are both of the type 1N4001. Diodes D1 and D2 are both of the type 1N5400. Zener diode Z1 can be any type having a threshold voltage of 12 V. Light-emitting diode 13 can be of practically any type. Transformer T1 is comprised of inductors L1, L2, L3, L4, L5 and L6. They are wound on core X which, in the preferred embodiment, is core number 3618 by Stackpole. Inductors L1 and L2 both consist of two windings. Inductors L3 and L4 each consist of 13 windings. Inductors L5 and L6 each consist of four windings.

Although the present invention has been described in terms of the presently preferred embodiment, it is to be understood that such disclosure is not to be interpreted as limiting. Various alterations and modifications would be possible. Accordingly, it is intended that the appended claims be interpreted as covering all alterations and modifications as fall within the true spirit and scope of this present invention.

We claim:

1. A self-contained battery charger for use in charging an automotive-type battery that has a pair of terminals, said battery charger comprising:
   battery means providing a predetermined battery voltage;
   means powered by said predetermined battery voltage for creating an AC voltage signal of predetermined magnitude;
   rectifier means for converting said AC voltage signal to a DC voltage of predetermined magnitude;
   summing means for creating a battery charging signal formed by adding said predetermined battery voltage to said DC voltage; and
   conveying means for conveying said battery charging signal from said summing means to the terminals of said automotive-type battery to charge the automotive-type battery.

2. The battery charger of claim 1, wherein said terminals of said automotive-type battery are connected to a cigarette lighter socket and wherein said conveying means comprises:
   a cigarette lighter plug having a pair of conductive connectors, said plug being adapted to be connected to the cigarette lighter socket; and
   cable means for conveying said battery charging signal from said summing means to said conductive connectors of said plug for application across the terminals of said automotive-type battery.

3. A self-contained battery charger for recharging an automotive-type battery that has a pair of terminals, said battery charger comprising:
   a rechargeable battery having an output voltage signal of a defined DC voltage and rated at a predetermined current, said rechargeable battery having first and second connection terminals;
   switching means connected to one of said connection terminals and operative in first and second positions;
   oscillator means, powered by said rechargeable battery when said switch is in said first position, for providing an oscillating output voltage;
   transformer means responsive to said oscillating output voltage for providing an AC voltage signal of predetermined magnitude;
   rectifier means for converting said AC voltage signal to a DC voltage signal of predetermined magnitude;
   summing means for creating a charging signal formed by adding said output voltage signal of said rechargeable battery to said DC voltage signal; and
   connecting means for applying said charging signal across the pair of terminals of said automotive-type battery.

4. The battery charger of claim 3, further comprising:
   voltage sensing means for producing a control signal upon detecting a predetermined low voltage or a short circuit across the terminals of said automotive-type battery; and
   regulating means responsive to said control signal for reducing current flow to said automotive-type battery in the case of a low voltage detection and to stop current flow in the case of a short circuit detection.

5. The battery charger of claim 3, wherein said terminals of said automotive-type battery are connected to a cigarette lighter socket and wherein said connecting means comprises:
   a cigarette lighter plug having a pair of conductive connectors, said plug being adapted to be connected to the cigarette lighter socket; and
   cable means for conveying said charging signal from said summing means to said conductive connectors of said plug for application across the terminals of said automotive-type battery.

6. The apparatus of claim 3, wherein said connecting means comprises:
   an elongated cable including a pair of conductive leads;

means connected to the leads at one end of said cable for receiving said signal from said summing means; and clip means connected to the leads at the other end of said cable for conveying said charging signal to the terminals of the automotive-type battery.

7. The battery charger of claim 3, further comprising a means for conveying current in the form of a recharging current from said automotive-type battery to said rechargeable battery when said switch means is in said second position.

8. The battery charger of claim 3, further comprises a socket means electrically connected to said rechargeable battery when said switch means is in said second position, said socket means adopted to be electrically connected to a battery-operated device to render the device operative.

9. The battery charger of claim 3, further comprising a socket means electrically connected to said rechargeable battery when said switch means is in said second position, said socket means adapted to be electrically connected to a battery device or to provide a recharging current to said rechargeable battery.

10. An apparatus for charging an automotive-type battery that has a pair of terminals and for providing a source of power in the form of a DC voltage, said apparatus comprising:
a self-contained rechargeable battery having an output signal of a predetermined DC voltage and rated at a predetermined current;
switch means connected to said rechargeable battery and operative in first and second positions;
oscillating means, powered by said rechargeable battery when said switch means is in said first position, for providing an oscillating output voltage;
transformer means having primary and secondary windings for receiving said oscillating output voltage across said primary winding and inducing a voltage across said secondary winding;
regulating means in series with said rechargeable battery and said secondary winding for limiting current supplied to said automotive-type battery;
rectifier means for converting said induced voltage into a DC voltage signal;
summing means for providing a charging signal by summing the DC voltage and current from said rechargeable battery and the DC voltage and rectified current from said rectifying means; and
connecting means for applying said charging signal across the pair of terminals of said automotive-type battery.

11. The apparatus of claim 10, further comprising:
voltage sensing means for producing a control signal upon detecting a predetermined low voltage or a short circuit across the terminals of said automotive-type battery; and
said regulating means includes means response to said control signal for reducing current flow to said automotive-type battery in the case of a low voltage detection and to stop current flow in the case of a short circuit detection.

12. The apparatus of claim 10, wherein said terminals of said automotive-type battery are connected to a cigarette lighter socket and wherein said connecting means comprises:
a cigarette lighter plug having a pair of conductive connectors, said plug being adapted to be connected to the cigarette lighter socket; and
cable means for conveying said charging signal from said summing means to said conductive connectors of said plug for application across the terminals of said automotive-type battery.

13. The apparatus of claim 10, wherein said connecting means comprising:
an elongated cable including a pair of conductive leads;
means connected to the leads at one end of said cable for receiving said signal from said summing means; and
clip means connected to the leads at the other end of said cable for conveying said charging signal to the terminals of the automotive-type battery.

14. The apparatus of claim 10, further comprising a means for conveying current in the form of a recharging current from said automotive-type battery to said rechargeable battery when said switch means is in said second position.

15. The apparatus of claim 14, further comprising an ammeter connected to said rechargeable battery and operative in two directions for monitoring current flow out of said rechargeable battery when charging said automotive-type battery and for monitoring said recharging current flowing into said rechargeable battery.

16. The apparatus of claim 10, further comprising an indicator means connected across the terminals of said automotive-type battery for indicating when said automotive-type battery is charged.

17. The apparatus of claim 10, further comprising a socket means electrically connected to said rechargeable battery when said switch means is in said second position, said socket means adapted to be electrically connected to a battery-operated device to render the device operative.

18. The apparatus of claim 10, further comprising a socket means electrically connected to said rechargeable battery when said switch means is in said second position, said socket means is adapted to be electrically connected to a battery device or to provide a recharging current to said rechargeable battery.

19. A self-contained battery charger for use in charging an automotive-type battery that has a pair of terminals, said battery charger comprising:
battery means providing a predetermined voltage and a predetermined current;
voltage generating means powered by said battery means for generating a second voltage and a second current;
summing means for creating a battery charging signal formed by adding said predetermined voltage and said predetermined current, respectively, to said second voltage and said second current;
voltage sensing means for producing a control signal upon detecting a predetermined low voltage or a short circuit across the terminals of said automotive-type battery; and
conveying means for conveying said battery charging signal from said summing means to the terminals of said automotive-type battery to charge the automotive-type battery, said conveying means including means responsive to said control signal for reducing current flow to said automotive-type battery in the case of a low voltage detection and to stop current flow in the case of a short circuit detection.

20. A self-contained battery charger for use in charging an automotive-type battery that has a pair of terminals, said battery charger comprising:

a self-contains rechargeable battery having an output signal of a predetermined DC voltage and rated at a predetermined current;

voltage generating means powered by said battery means for generating a second voltage and a second current;

summing means for creating a battery charging signal formed by adding said predetermined voltage and said predetermined current, respectively, to said second voltage and said second current;

conveying means for conveying said battery charging signal from said summing means to the terminals of said automotive-type battery to charge the automotive-type battery;

switch means connected to said rechargeable battery and operative in first an second positions; and means for conveying current in the form of a recharging current from said automotive-type battery to said rechargeable battery when said switch means is in the second position.

* * * * *